Patented Mar. 19, 1940

2,194,075

UNITED STATES PATENT OFFICE 2,194,075

DIHYDROAROMATIC CYANAMIDES

Richard O. Roblin, Jr., Stamford, Conn., assignor to American Cyanamid Company, New York, N. Y., a corporation of Maine No Drawing. Application May 23, 1939, Serial No. 275,217

4 Claims. (Cl. 260—551)

This invention relates to new disubstituted cyanamide compounds of the formula—

where R and R' each represent a hydroaromatic radical.

These compounds may be generally prepared in an inert solvent such as benzene or petroleum ether fractions, by the reaction between the corresponding secondary amine, and cyanogen chloride. A preferred equation for this reaction is as follows:

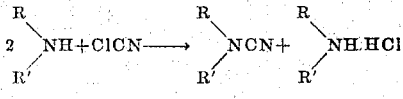

Example I 6.1 grams of cyanogen chloride are dissolved in 200 cc. of benzene. After cooling the solution to 0°–5° C., 36.2 grams of dicyclohexyl amine are gradually added with stirring. When this addition is completed, the dicyclohexyl amine hydrochloride is filtered off and washed with benzene. The washings and filtrate are united. The benzene is removed by distillation under reduced pressure. The residue is vacuum distilled and the product identified as dicyclohexyl cyanamide.

Example II 6.1 grams of cyanogen chloride are dissolved in 200 cc. of heptane. After cooling the solution to 0°–5° C., 41.8 grams of di-(2-methyl cyclohexyl) amine are gradually added with stirring. When this addition is completed, the di-(2-methyl cyclohexyl) amine hydrochloride is filtered off and washed with heptane. The washings and filtrate are united. The heptane is removed by distillation under reduced pressure. The residue is vacuum distilled and the product identified as di-(2-methyl cyclohexyl) cyanamide.

Example III 6.1 grams of cyanogen chloride are dissolved in 200 cc. of benzene. After cooling the solution to 0°–5° C., 41.8 grams of di-(3-methyl cyclohexyl) amine are gradually added with stirring. When this addition is completed, the di-(3-methyl cyclohexyl) amine hydrochloride is filtered off and washed with benzene. The washings and filtrate are united. The benzene is removed by distillation under reduced pressure. The residue is vacuum distilled and the product identified as di-(3-methyl cyclohexyl) cyanamide.

Example IV 6.1 grams of cyanogen chloride are dissolved in 200 cc. of heptane. After cooling the solution to 0°–5° C., 41.8 grams of di-(4-methyl cyclohexyl) amine are gradually added with stirring. When this addition is completed, the di-(4-methyl cyclohexyl) amine hydrochloride is filtered off and washed with heptane. The washings and filtrate are united. The heptane is removed by distillation under reduced pressure. The residue is vacuum distilled and the product identified as di-(4-methyl cyclohexyl) cyanamide.

Example V 6.1 grams of cyanogen chloride are dissolved in 200 cc. of heptane. After cooling the solution to 0°–5° C., 47.4 grams of di-(2-ethyl cyclohexyl) amine are gradually added with stirring. When this addition is completed, the di-(2-ethyl cyclohexyl) amine hydrochloride is filtered off and washed with heptane. The washings and filtrate are united. The heptane is removed by distillation under reduced pressure. The residue is vacuum distilled and the product identified as di-(2-ethyl cyclohexyl) cyanamide.

Example VI 6.1 grams of cyanogen chloride are dissolved in 250 cc. of benzene. After cooling the solution to 0°–5° C., 64.2 grams of di-(n-amyl cyclohexyl) amine are gradually added with stirring. When this addition is completed, the di-(n-amyl cyclohexyl) amine hydrochloride is filtered off and washed with benzene. The washings and filtrate are united. The benzene is removed by distillation under reduced pressure. The residue is vacuum distilled and the product identified as di-(n-amyl cyclohexyl) cyanamide.

Similarly other disubstituted cyanamides of the above class may be prepared utilizing the corresponding secondary amine.

It is to be understood that the above examples are illustrative only.

These new compounds are adapted for various uses, more particularly as intermediates and insecticides.

While the invention has been described with particular reference to specific embodiments, it is to be understood that it is not to be limited thereto but is to be construed broadly and restricted solely by the scope of the appended claims.
I claim:
1. As a new compound, a disubstituted cyanamide of the formula—
where R and R' each represent a hydroaromatic radical.
2. As a new compound, dicyclohexyl cyanamide.
3. As a new compound, di-(4-methylcyclohexyl) cyanamide.
4. As a new compound, di-(2-ethylcyclohexyl) cyanamide.
RICHARD O. ROBLIN, Jr.